United States Patent
Sieffert et al.

(10) Patent No.: US 12,092,184 B2
(45) Date of Patent: Sep. 17, 2024

(54) VIBRATION DAMPER MADE UP OF SPOKE SPRING ABSORBERS

(71) Applicant: Schaeffler Technologies AG & Co. KG, Herzogenaurach (DE)

(72) Inventors: Jean Sieffert, Lingolsheim (FR);
Urban Panther, Seelbach (DE);
Christopher Müller, Heidelberg (DE);
Joseph Gissler, Friesenheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/112,077

(22) Filed: Feb. 21, 2023

(65) Prior Publication Data
US 2023/0265908 A1    Aug. 24, 2023

(30) Foreign Application Priority Data
Feb. 21, 2022    (DE) .......................... 102022104006.2

(51) Int. Cl.
*F16F 15/14*    (2006.01)

(52) U.S. Cl.
CPC ...... *F16F 15/1421* (2013.01); *F16F 2222/08* (2013.01); *F16F 2232/02* (2013.01); *F16F 2236/08* (2013.01)

(58) Field of Classification Search
CPC .. F16F 7/104; F16F 7/108; F16F 7/116; F16F 15/121; F16F 15/1421; F16F 15/1435; F16F 2222/08; F16F 2232/02; F16F 2236/08
See application file for complete search history.

(56) References Cited

U.S. PATENT DOCUMENTS

| | | | | |
|---|---|---|---|---|
| 1,939,173 | A * | 12/1933 | Junkers | F16F 15/121 74/574.4 |
| 3,690,414 | A * | 9/1972 | Aggarwal | B23Q 11/0032 408/143 |
| 4,784,006 | A * | 11/1988 | Kethley | F03G 3/00 180/7.1 |
| 5,209,461 | A * | 5/1993 | Whightsil, Sr. | A63B 21/0455 267/155 |
| 6,440,044 | B1 * | 8/2002 | Francis | F16F 3/12 482/137 |

(Continued)

FOREIGN PATENT DOCUMENTS

| | | |
|---|---|---|
| CN | 1782461 A | 6/2006 |
| CN | 101205959 A | 6/2008 |

(Continued)

OTHER PUBLICATIONS

Machine translation of DE 102018131111 A1 obtained on Dec. 7, 2023.*

*Primary Examiner* — Adam D Rogers
(74) *Attorney, Agent, or Firm* — Volpe Koenig (57) ABSTRACT

A vibration damper with at least two absorbers, each having at least one spoke spring, enables efficient damping of the frequency response of a crankshaft. The absorbers preferably have different natural frequencies that are adapted to the frequency response of the crankshaft. The absorbers exhibit a frequency response, which is not or only insignificantly dependent on aging of the spoke springs and on the ambient temperature. The corresponding vibration dampers can be easily designed and mounted.

16 Claims, 4 Drawing Sheets

(56) References Cited

U.S. PATENT DOCUMENTS

| | | | |
|---|---|---|---|
| 8,863,925 B2 | 10/2014 | Antchak et al. | |
| 10,030,731 B1* | 7/2018 | Hundley | F16F 1/48 |
| 10,288,121 B2* | 5/2019 | Salas | F16C 19/527 |
| 10,724,600 B2* | 7/2020 | Matsuoka | H02K 11/30 |
| 11,028,897 B2* | 6/2021 | Jia | F16F 15/1428 |
| 2004/0134733 A1* | 7/2004 | Wood | F16F 7/104 |
| | | | 188/379 |
| 2012/0149511 A1* | 6/2012 | Hodjat | F16F 15/1215 |
| | | | 474/94 |
| 2015/0226310 A1* | 8/2015 | Schubert | F16H 55/40 |
| | | | 254/390 |
| 2017/0241497 A1* | 8/2017 | Mooney | F16F 1/027 |
| 2022/0010859 A1* | 1/2022 | Ota | F16F 15/3153 |

FOREIGN PATENT DOCUMENTS

| | | | | |
|---|---|---|---|---|
| CN | 105150755 A | | 12/2015 | |
| CN | 112539237 A | * | 3/2021 | F16F 7/06 |
| CN | 219795972 U | * | 10/2023 | |
| DE | 3529687 A1 | * | 3/1987 | |
| DE | 19708082 | | 8/2001 | |
| DE | 60119333 | | 4/2007 | |
| DE | 19652730 | | 8/2007 | |
| DE | 19949206 | | 4/2009 | |
| DE | 102011001174 A1 | | 9/2012 | |
| DE | 102015213653 | | 1/2017 | |
| DE | 102017114491 | | 1/2019 | |
| DE | 102018111409 | | 11/2019 | |
| DE | 102018131111 | | 6/2020 | |
| DE | 102019101983 A1 | * | 7/2020 | F16F 15/1428 |
| EP | 1412656 | | 12/2007 | |

* cited by examiner

VIBRATION DAMPER MADE UP OF SPOKE SPRING ABSORBERS

CROSS-REFERENCE TO RELATED APPLICATIONS

This application claims priority from German Patent Application No. 10 2022 104 006.2, filed Feb. 21, 2022, the entire contents of which is incorporated herein by reference as if fully set forth.

TECHNICAL FIELD

The present disclosure relates to a vibration damper for use in a motor vehicle, in particular for damping the vibrations of a crankshaft.

BACKGROUND

Crankshaft dampers for damping crankshaft vibrations have been known for a number of years. In operation, a crankshaft on an internal combustion engine rotates in response to the periodic pulses of the cylinders as they operate in turn. This generates vibrations in the crankshaft, which are detrimental to the long-term life of the engine as well as the associated components. Known crankshaft dampers can be provided with an elastomer ring pressed between a flange and a flywheel mass. To this end, a wide variety of embodiments exist. Typical examples are disclosed in EP 1 412 656 B1 or DE 601 19 333 T2. Due to the temperature dependence of the spring properties of the elastomer, relatively large masses are used in this solution to ensure a minimum effect even under unfavorable temperature conditions. Another well-known way of damping crankshaft vibrations is the use of viscous dampers. Typical examples are disclosed in DE 197 08082 A1 or U.S. Pat. No. 8,863,925 B2. Viscous dampers achieve a better damping effect compared to the crankshaft dampers with the elastomer ring. However, this advantage is offset by a significantly higher price. Crankshaft dampers with compression springs are also known. Corresponding examples are known from DE 199 49 206 B4 or DE 196 52 730 B4. DE 10 2015 213 653 A1 describes a vibration damper based on a spoke spring, which acts as an absorber and thus dampens exactly one frequency of the crankshaft. This damping behavior is often insufficient.

SUMMARY

Proceeding therefrom, the object of the present disclosure is to at least partially overcome the problems known from the prior art.

This object is achieved with one or more of the features disclosed herein. Further advantageous embodiments according to the disclosure are specified below and in the claims. The features listed individually can be combined with one another in a technologically meaningful manner and can define further embodiments according to the disclosure. In addition, the features indicated in the claims are specified and explained in more detail in the description, wherein further preferred embodiments are shown.

A vibration damper for damping torsional vibrations, in particular for use in the drive train of a motor vehicle, which is rotatable about an axis of rotation, comprising at least two absorbers, wherein each absorber has a natural frequency, wherein each absorber has at least one spoke spring having the natural frequency of the absorber, wherein each spoke spring has a circular ring-like outer element radially on the outside and a connecting element for connecting to a shaft radially on the inside and has a plurality of spokes extending in the radial direction, which are designed to be elastic, wherein the vibration damper comprises at least two absorbers each having different natural frequencies.

The vibration damper is preferably made up exclusively of absorbers, each of which has a natural frequency and each of which comprises at least one spoke spring having the corresponding natural frequency. Each absorber can be formed from one or more spoke springs with identical natural frequencies. The spoke spring as a vibration damper with spring coupling consists, in principle, of a rotating mass of the outer element with a defined mass moment of inertia, which is connected via the spokes designed as spring elements to the connecting element and via the latter to the shaft, in particular a crankshaft. The natural frequency of the vibration damper results from the torsional rigidity of the spring elements and the mass moment of inertia of the rotating mass. The spokes are preferably arranged in one plane, which minimizes the axial space required for the spoke spring.

It has been shown that by using at least two absorbers made up of spoke springs having different natural frequencies, damping of crankshaft vibrations, in particular, can be achieved. In this regard, the natural frequencies must be adapted to the overall system consisting of the shaft to be damped having a shaft natural frequency and the vibration damper with at least two absorbers. The spoke springs are constructed from a steel, at least the spokes preferably from a spring steel.

The vibration damper, made up of absorbers each comprising at least one spoke spring, allows for efficient damping of the frequency response of a crankshaft in particular. The individual absorbers are made up of spoke springs formed from a steel, so that the influence of aging and temperature present in crankshaft dampers with elastomeric elements is significantly reduced compared with the prior art. The corresponding vibration dampers are also simple in design and can be manufactured at low cost.

An embodiment is preferred, in which a first natural frequency of a first absorber is tuned to the natural frequency of the shaft, in particular corresponds to it or deviates from it by at most 20 Hz. This produces a frequency response curve (i.e., vibration amplitude versus rotation frequency) with two maxima, one occurring at a frequency greater than the natural frequency of the shaft and the other occurring at a frequency lower than the natural frequency of the shaft. The amplitudes of these maxima are smaller than the amplitude at the natural frequency of the undamped shaft. Furthermore, it is preferred if a second natural frequency of a second absorber is tuned to a frequency of one of these maxima or deviates from it by at most 20 Hz. This results in a frequency response with three maxima, though all of them have smaller amplitudes than the previous maxima with only one absorber. Further absorbers can be added according to the same scheme, wherein the damping improves continuously.

Preferably, the vibration damper comprises at least three absorbers each having different natural frequencies. By increasing the number of absorbers, the damping can be improved continuously.

Preferably, an absorber comprises a plurality of spoke springs each having the natural frequency of the absorber. This facilitates the formation of the absorber, as it is easier to form several thin spoke springs, which therefore have a small expansion in the axial direction, than one thicker spoke spring, in particular if the spoke springs are produced by a punching process.

Preferably, the spokes are designed as torsion spring bars. These can advantageously absorb the relative movement between the outer element and the connecting element and can be easily formed.

Preferably, the natural frequencies of all absorbers differ from one another. This allows the natural frequencies of the absorbers to cover a wider frequency range. Preferably, the natural frequencies of the absorbers are selected such that the natural frequency of the shaft is in the range covered by the natural frequencies of the absorbers. Preferably, the natural frequencies of the absorbers are selected such that the natural frequency of the crankshaft is located in the middle 20% of the frequency space spanned by the natural frequencies of the absorbers. For example, if the lowest natural frequency of an absorber is 400 Hz and the highest natural frequency is 620 Hz, the natural frequency of the crankshaft is preferably in the range from 488 Hz to 532 Hz.

Preferably, the spoke springs are arranged one behind the other in the direction of the axis of rotation, wherein spoke springs adjacent to one another in the direction of the axis of rotation are in contact. The spoke springs of different absorbers can be rotated against one another at least up to predeterminable limit vibration amplitudes. The contact of spoke springs adjacent in the direction of the axis of rotation causes friction between them, so that damping of the relative movements occurs without the need to form an additional friction element.

Furthermore, a vibration damper for damping the vibration behavior of a particular crankshaft system having a crankshaft natural frequency is proposed, wherein the vibration damper is configured as set forth herein, wherein a first absorber has a first natural frequency and a second absorber has a second natural frequency, and the first natural frequency is below and the second natural frequency is above the crankshaft natural frequency. This achieves a damping of the crankshaft vibrations.

Furthermore, a vibration damper for damping the vibration behavior of a particular crankshaft system having a crankshaft natural frequency is proposed, wherein the vibration damper is designed as described herein, wherein a first absorber has a first natural frequency, which deviates by at most 20 Hz from the crankshaft natural frequency, wherein a second absorber has a second natural frequency, which deviates by at most 20 Hz from a frequency of a maximum of the frequency response of a crankshaft system damped by the first absorber.

Here, the first absorber is tuned in its first natural frequency to the natural frequency of the crankshaft. This results in a frequency response with two maxima instead of one maximum at the natural frequency of the crankshaft in the undamped case, one on the right and one on the left (i.e. at higher and lower frequencies), each with a smaller amplitude than the one maximum in the undamped case. The second natural frequency of the second absorber is then tuned to one of the frequencies of one of these maxima. The resulting frequency response then exhibits three maxima, again with a reduced amplitude.

This can preferably be taken further by forming at least one further absorber having a further natural frequency, wherein the following applies for each further absorber: its further natural frequency deviates by at most 20 Hz from the frequency of a maximum of the frequency response of a crankshaft system damped by the remaining absorbers. As an example, a third absorber is formed with a third natural frequency tuned to a frequency of one of the three maxima from the system with two absorbers, and so on.

Further proposed is a kit comprising a crankshaft having a crankshaft natural frequency and a vibration damper as described herein, in which a first absorber has a first natural frequency which is below the crankshaft natural frequency and a second absorber has a second natural frequency which is above the crankshaft natural frequency. A damping of the frequency response can thus be achieved.

As a precaution, it should be noted that the numerical designations used here ("first", "second", etc.) serve primarily (only) to distinguish between several similar objects, sizes, or processes, and in particular no necessary dependency and/or sequence of these objects, sizes, or processes to each other is purported. If a dependency and/or sequence is necessary, this is explicitly stated here or results in a manner obvious to the person skilled in the art when studying the specifically described configuration.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic in nature. Identical reference symbols indicate the same objects, so that explanations from other figures can also be used. In the figures.

DETAILED DESCRIPTION

Figure 1:
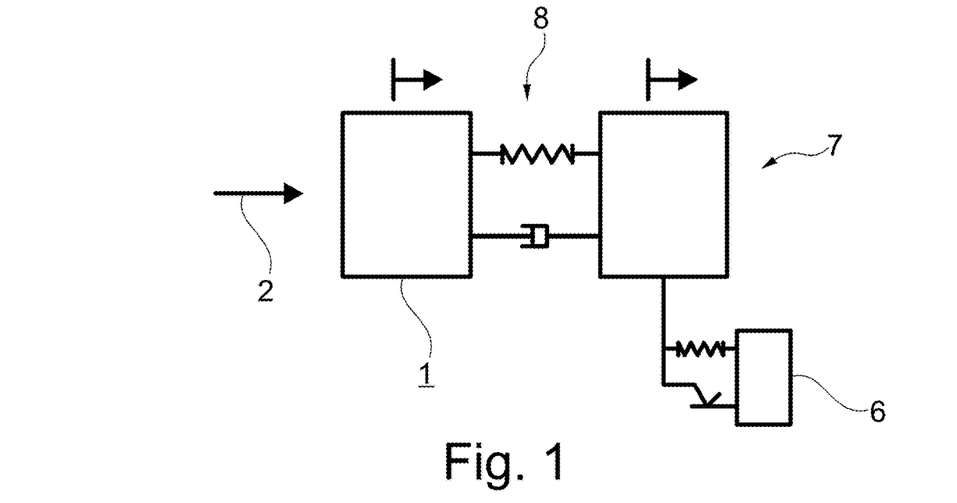
FIG. 1: shows a first vibration model, which is not part of the disclosure.
Figure 2:
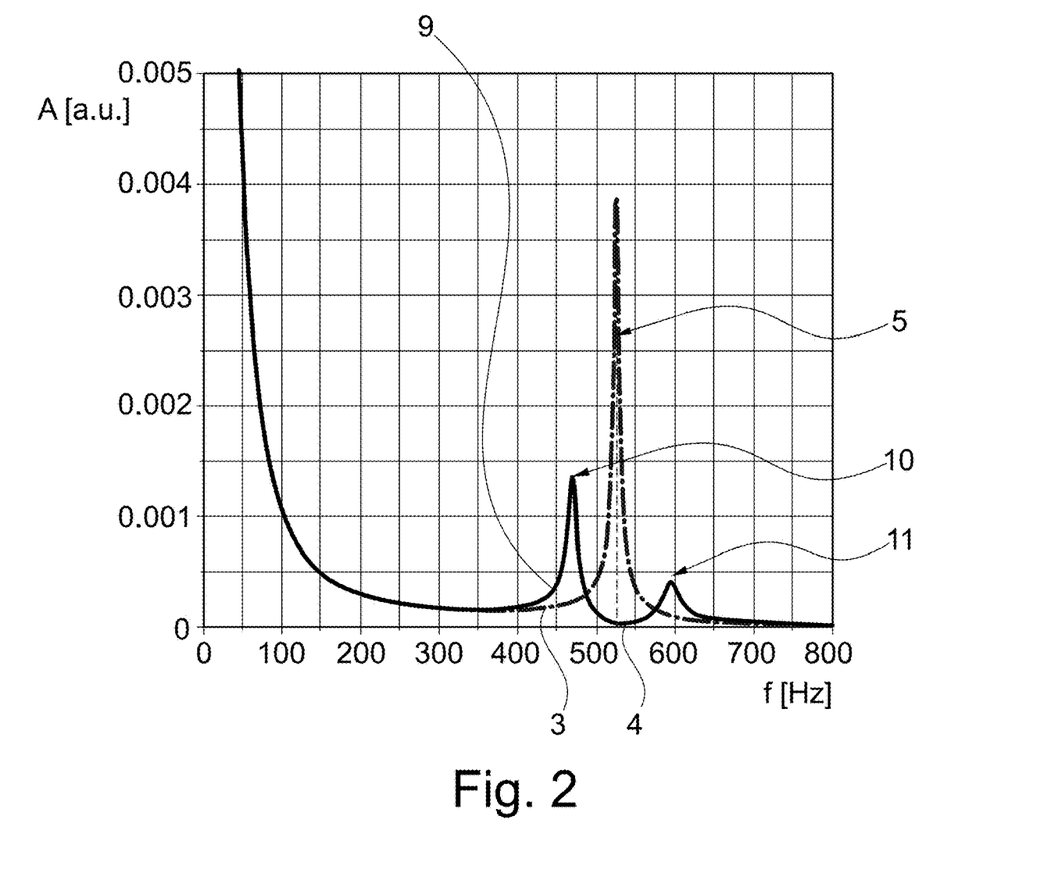
FIG. 2: shows the frequency response of the first vibration model.

FIG. 1 shows a first vibration model for an example not covered by the disclosure. This comprises a crankshaft system 1 representing the crankshaft of an internal combustion engine and associated vibrating masses. The internal combustion engine (not shown) generates a torque 2, which is fed into the crankshaft system 1. In a known manner, this torque is frequency-dependent and the frequency response of the crankshaft system 1 is also frequency-dependent with a natural or resonant frequency. FIG. 2 shows the frequency response of this crankshaft system 1 as the crankshaft frequency response 3, which shows a vibration amplitude A of the crankshaft as a function of the rotation frequency f. The crankshaft system 1 has a single crankshaft natural frequency 4, at which the single maximum 5 of the crankshaft frequency response 3 is correspondingly located.

FIG. 1 further shows a first absorber 6, which is designed as a spoke spring absorber with a spoke spring. Spoke spring absorbers are described in detail below with reference to FIGS. 7 and 8. They have an outer circular ring-like element and an inner connecting element for connecting to the crankshaft, which are connected by radially extending elastically deformable spokes. Based on the design of the spoke spring absorber, in particular by determining the mass of the outer element, the radius of the outer element and/or the number and/or spring constant (thickness) of the spokes, the natural frequency of the first absorber 6 can be determined. The first absorber 6 forms a vibrating system 7, the vibration behavior of which is determined by the first absorber 6. The natural frequency of the first absorber 6 is therein tuned to the crankshaft natural frequency 4.

If the vibrating system 7 is now connected to the crankshaft system 1 in which the connecting element of the first absorber 6, which is not shown, is connected to the crankshaft in a non-rotatable manner, these together form a first damped crankshaft system 8 with the first crankshaft system frequency response 9 shown in FIG. 2. This frequency response of the first damped crankshaft system 8 has a first maximum 10 and a second maximum 11, which are located at frequencies that are below the crankshaft natural frequency 4 for the first maximum 10 and above the crankshaft natural frequency 4 for the second maximum 11. The vibration amplitude A of the first maximum 10 and the second maximum 11 are significantly lower than the vibration amplitude A of the maximum 5 of the crankshaft frequency response 3. The crankshaft frequency response 3 shown in FIG. 2 is the frequency response of the pure crankshaft system 1 without absorbers.

Figure 3:
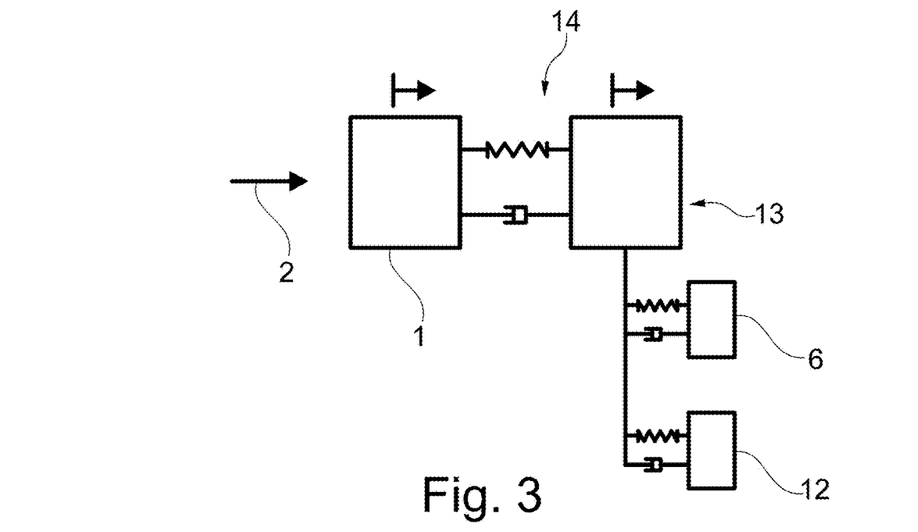
FIG. 3: shows the vibration model of a first example of a vibration damper made up of two absorbers.
Figure 4:
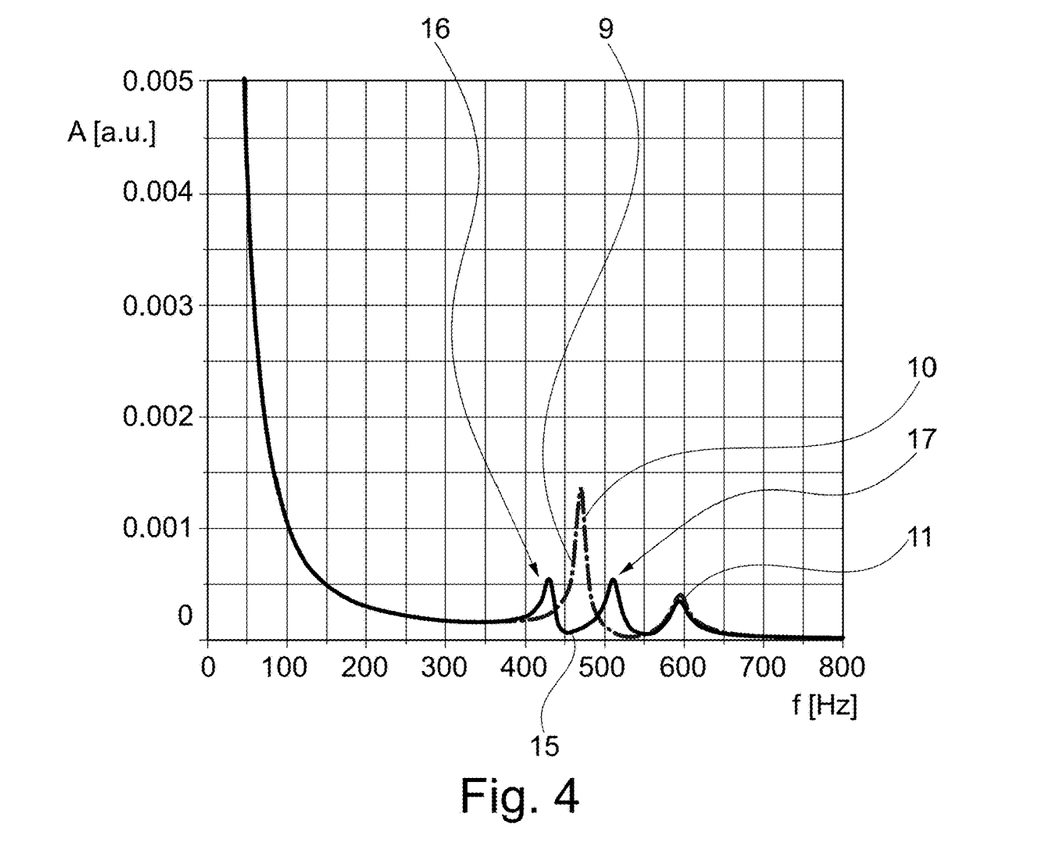
FIG. 4: shows the frequency response of the first example of a vibration damper.
Figure 5:
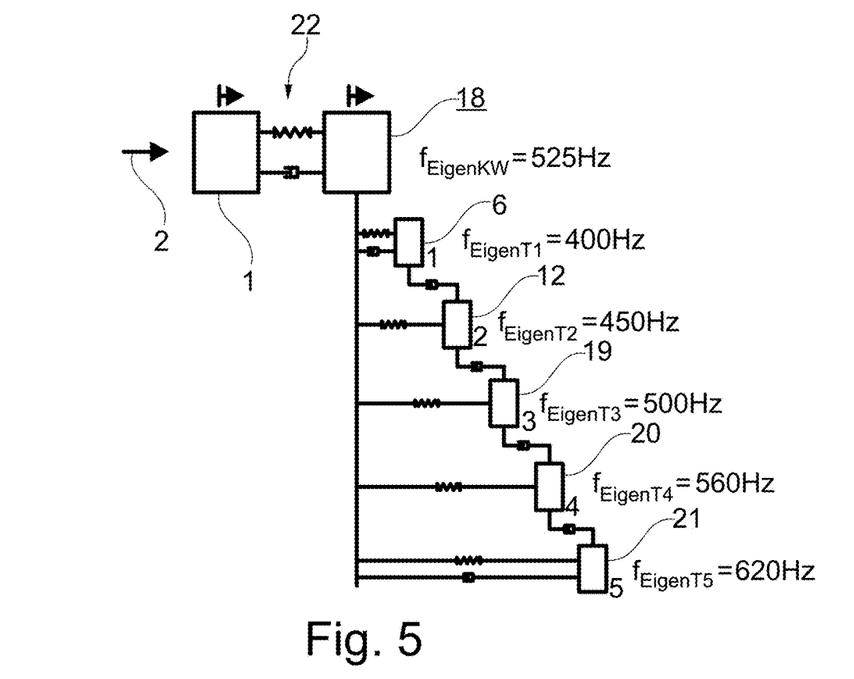
FIG. 5: shows the vibration model of a second example of a vibration damper made up of five absorbers.
Figure 6:
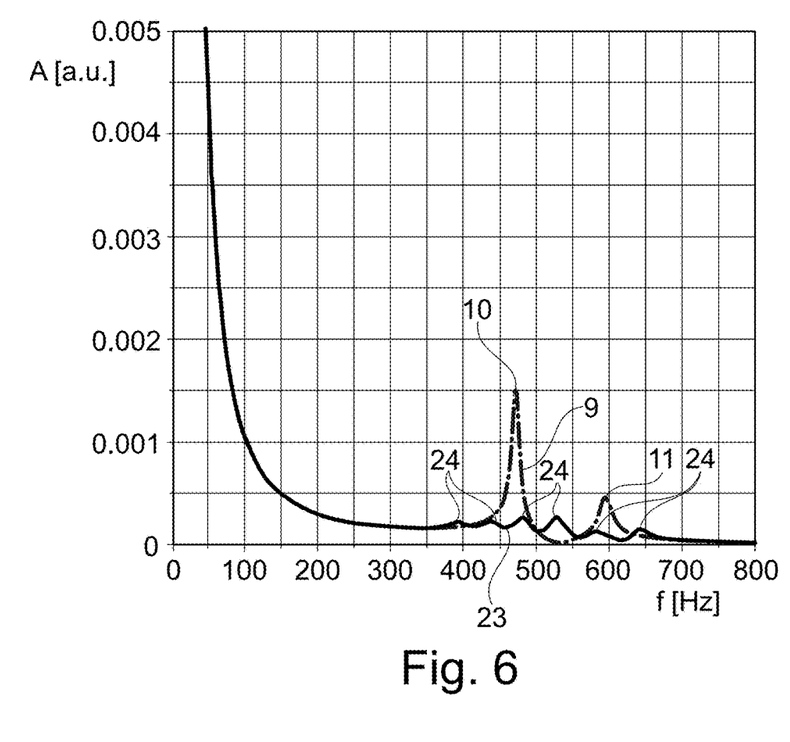
FIG. 6: shows the frequency response of the second example of a vibration damper.

In the following FIGS. 3 to 6, two examples of vibration dampers according to the disclosure are explained. The corresponding vibration models are shown in FIGS. 3 and 5, the associated frequency responses are shown in FIGS. 4 and 6. FIGS. 4 and 6 each show the first crankshaft system frequency response 9 of FIG. 2 for comparison.

FIG. 3 shows a vibration model of a first example of a first vibration damper 13 made up of the first absorber 6 and a second absorber 12. The first absorber 6 corresponds to the first absorber 6 of FIG. 1. The second absorber 12 is also designed as a spoke spring absorber. Its natural frequency is therein tuned to the frequency of the first maximum 10 of FIG. 2, i.e. to the frequency of the higher maximum of the first crankshaft frequency response 9. The first vibration damper 13 is connected to the crankshaft, which is not shown, by connecting the connecting elements, which are not shown, of the first absorber 6 and the second absorber 12, so that the vibration damper 13 is connected to the crankshaft system 1, which together form the second damped crankshaft system 14.

The second damped crankshaft system 14 exhibits a second crankshaft system frequency response 15, as shown in FIG. 4. This exhibits, in addition to a second maximum 11 corresponding to the second maximum 11 of the first crankshaft system frequency response 9, a third maximum 16 and a fourth maximum 17, wherein the third maximum 16 is at a frequency f below the frequency f of the first maximum 10 and the fourth maximum 17 is at a frequency f above the frequency of the first maximum 10. The amplitudes A of the third maximum 16 and the fourth maximum 17 are smaller here than the amplitude A of the first maximum 10 of the first crankshaft system frequency response 9. This shows that the use of a vibration damper 13 with a plurality of absorbers 6, 12 designed as spoke spring absorbers can achieve good damping of the crankshaft system 1.

FIG. 5 shows a vibration model of a second example of a second vibration damper 18 comprising a first absorber 6 and a second absorber 12, each designed as described above. Furthermore, the second vibration damper 18 comprises a third absorber 19, a fourth absorber 20, and a fifth absorber 21, each of which is designed as a spoke spring absorber. In FIG. 5, the natural frequencies of the undamped crankshaft system 1 (here 525 Hz) and the natural frequencies of the first absorber 6 (400 Hz), the second absorber 12 (450 Hz), the third absorber 19 (500 Hz), the fourth absorber 20 (560 Hz) and the fifth absorber 21 (620 Hz) are indicated in each case. When the second vibration damper 18 is connected to the crankshaft system 1, a third damped crankshaft system 22 is formed. The corresponding third crankshaft system frequency response 23, in addition to the curve of the first crankshaft system frequency response 9 serving as a reference curve, is shown in FIG. 6. Accordingly, the third crankshaft system frequency response 23 exhibits six maxima 24 extending over frequencies from below the lowest natural frequency of an absorber 6, 12, 19, 20, 21 (here 400 Hz) to above the highest natural frequency of an absorber 6, 12, 19, 20, 21 (here 620 Hz). The amplitude A of the maxima 24 is significantly lower than the amplitude of the first maximum 10 and the second maximum 11, such that significant damping of the crankshaft vibrations occurs here.

Figure 7:
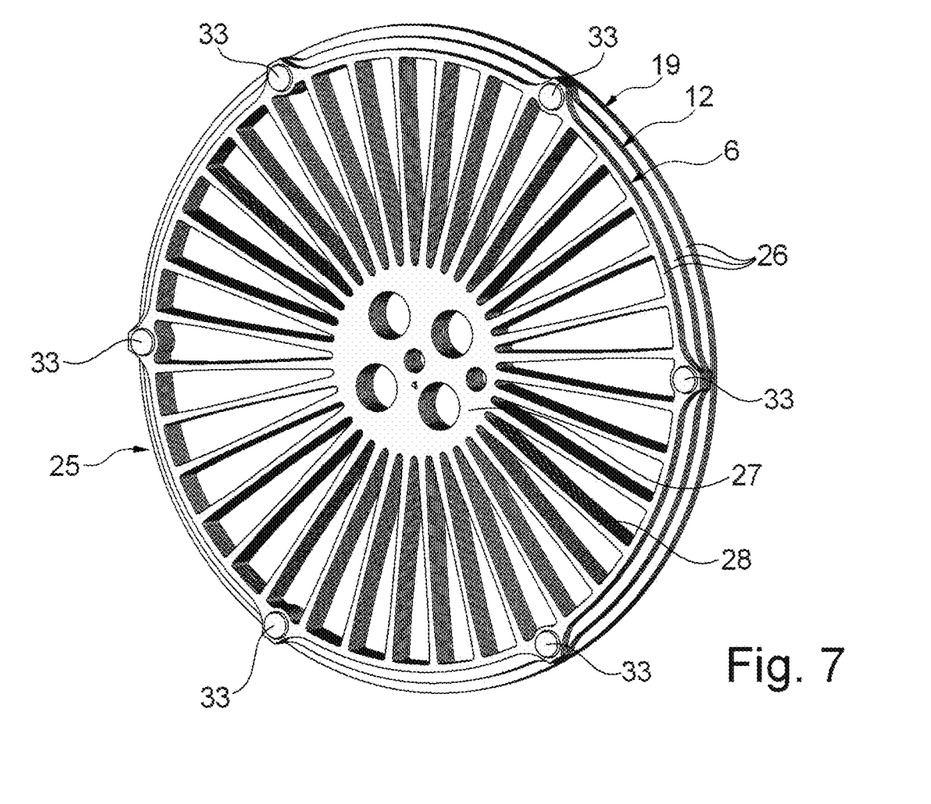
FIGS. 7 and 8: show a third example of a vibration damper in a perspective view and as a cross-section.
Figure 8:
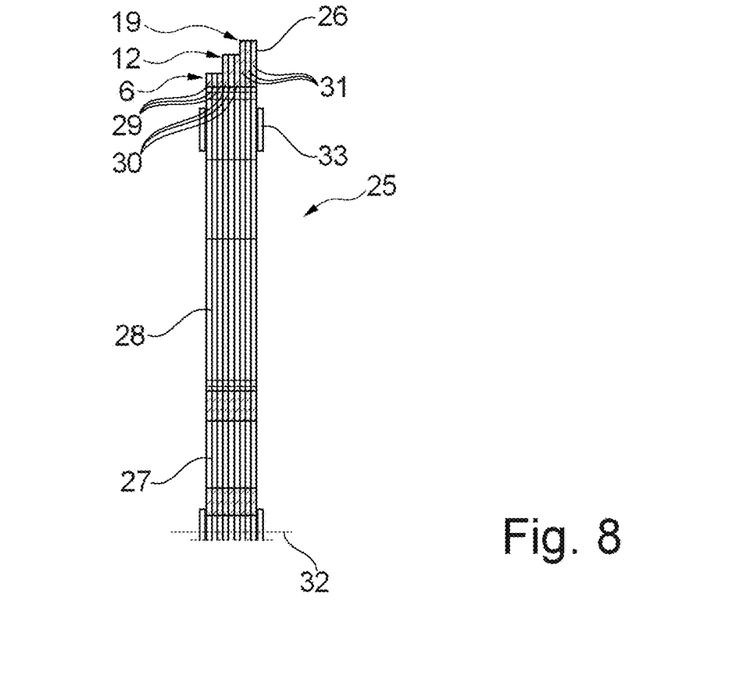

FIGS. 7 and 8 show an example of a third vibration damper 25 in a perspective view (FIG. 7) and as a sectional view (FIG. 8). These two figures are described together in the following, unless explicitly stated otherwise, so that the explanations refer to both figures. In the present example, the third vibration damper 25 is made up of three absorbers: a first absorber 6, a second absorber 12, and a third absorber 19. Each absorber 6, 12, 19 is, in turn, made up of three identical spoke springs, the first absorber 6 being made up of three identical first spoke springs 29, the second absorber 12 being made up of three identical second spoke springs 30 and the third absorber 19 being made up of three identical third spoke springs 31, as shown, in particular, in FIG. 8.

The spoke spring absorbers are each formed from a circular ring-like outer element 26, an inner connecting element 27 and spokes 28 extending radially between them, which for the sake of clarity are only partially indicated with reference symbols. The spokes 28 are designed as torsion spring bars here. The spoke springs 29, 30, 31 adjacent in the direction of an axis of rotation 32 of the absorbers 6, 12, 19 are in contact with one another, so that in the event of a deflection of an absorber 6, 12, 19, the movement is damped here by the friction present.

The natural frequency of an absorber 6, 12, 19 and, in general, of a spoke spring absorber can be influenced by changing the corresponding outer element 26, in particular by changing the mass and/or the radius of the outer element 26 and/or by changing the spokes 28, in particular by changing the number of spokes 28 and/or the spring constant of the spokes 28. In the present example, the first absorbers 6, the second absorbers 12 and the third absorbers 19 each differ in their outer elements 26, which have different expansions in the radial direction relative to the axis of rotation 32 and different masses, resulting in different mass moments of inertia of the outer elements 26 of the different spoke springs 29, 30, 31. In this example, the spokes 28 of the spoke springs 29, 30, 31 of the absorbers 6, 12, 19 are identical in number, position and design. The connecting elements 27 connect the absorbers 6, 12, 19 to the crankshaft, which is not shown.

The absorbers 6, 12, 19 in the third vibration damper 25 are connected by rolling bodies 33, which allow a relative movement against one another. For this purpose, corresponding elongated holes are formed in the outer elements 26, which allow a relative movement of the absorbers 6, 12, 19 against one another.

The structure of a vibration damper 13, 18, 25 proposed here with at least two absorbers 6, 12, 19, 20, 21, each comprising at least one spoke spring 29, 30, 31, enables efficient damping of the frequency response of a crankshaft. In this regard, the absorbers 6, 12, 19, 20, 21 preferably have different natural frequencies that are adapted to the frequency response of the crankshaft. The absorbers 6, 12, 19, 20, 21 exhibit a frequency response, which is not or only insignificantly dependent on aging of the spoke springs 29, 30, 31 and on the ambient temperature. The corresponding vibration dampers 13, 18, 25 can be easily designed and mounted.

LIST OF REFERENCE SYMBOLS

1 Crankshaft system
2 Torque
3 Crankshaft frequency response
4 Crankshaft natural frequency
5 Maximum
6 First absorber
7 Vibrating system
8 First damped crankshaft system
9 First crankshaft system frequency response
10 First maximum
11 Second maximum
12 Second absorber
13 First vibration damper
14 Second damped crankshaft system
15 Second crankshaft system frequency response
16 Third maximum
17 Fourth maximum
18 Second vibration damper
19 Third absorber
20 Fourth absorber
21 Fifth absorber
22 Third damped crankshaft system
23 Third crankshaft system frequency response
24 Maximum
25 Third vibration damper
26 Outer element
27 Connecting element
28 Spoke
29 First spoke spring
30 Second spoke spring
31 Third spoke spring
32 Axis of rotation
33 Rolling body
A Vibration amplitude
f Rotation frequency

The invention claimed is:

1. A vibration damper for damping torsional vibrations, which is rotatable about an axis of rotation, the vibration damper comprising:
at least two absorbers, each said absorber having a natural frequency and at least one spoke spring having the natural frequency of the absorber, each of the at least one spoke spring including;
a circular ring-shaped outer element radially on an outside;
a connecting element configured to connect to a shaft radially on an inside; and
a plurality of spokes extending in a radial direction between the circular ring-shaped outer element and the connecting element and the spokes are elastic, the plurality of spokes of each of the at least two absorbers being identical in number; and
wherein the at least two absorbers have different natural frequencies from one another, and wherein the spoke springs are arranged one behind another in a direction of the axis of rotation, and the spoke springs adjacent to one another in the direction of the axis of rotation are in contact.

2. The vibration damper according to claim 1, wherein the at least two absorbers comprises at least three of the absorbers each having different natural frequencies from one another.

3. The vibration damper according to claim 1, wherein one of the at least two absorbers comprises a plurality of the spoke springs each having the natural frequency of the absorber.

4. The vibration damper according to claim 1, wherein the spoke springs comprise torsion spring bars.

5. A vibration damper for damping a vibration behavior of a crankshaft system having a crankshaft natural frequency, the vibration damper comprising the vibration damper according to claim 1, wherein a first one of the at least two absorbers has a first said natural frequency and a second one of the at least two absorbers has a second said natural frequency, and the first natural frequency is below the crankshaft natural frequency and the second natural frequency is above the crankshaft natural frequency.

6. The vibration damper according to claim 5, wherein the at least two absorbers comprises a further absorber having a further natural frequency, the further natural frequency of the further absorber deviates by at most 20 Hz from a frequency of a maximum of a frequency response of the crankshaft system damped by the at least two absorbers.

7. A vibration damper for damping a vibration behavior of a crankshaft system having a crankshaft natural frequency, the vibration damper comprising the vibration damper according to claim 1, wherein a first one of the at least two absorbers has a first natural frequency, which deviates by at most 10 Hz from the crankshaft natural frequency, a second one of the at least two absorbers has a second natural frequency, which deviates by at most 20 Hz from a frequency of a maximum of a frequency response of the crankshaft system damped by the first absorber.

8. A kit comprising: a crankshaft having a crankshaft natural frequency and the vibration damper according to claim 1, wherein a first of the at least two absorbers has a first said natural frequency which is below the crankshaft natural frequency and a second of the at least two absorbers has a second natural frequency which is above the crankshaft natural frequency.

9. The vibration damper according to claim 1, wherein the plurality of spokes of each of the at least two absorbers are identical in design.

10. A vibration damper for damping torsional vibrations, the vibration damper comprising:
a first absorber and a second absorber, each of the first absorber and the second absorber having a respective first and second natural frequency, with the first natural frequency being different than the second natural frequency, each of the first absorber and the second absorber comprising a spoke spring including:
a ring-shaped outer element radially on an outside;

a connecting element radially on an inside; and
a plurality of spokes extending in a radial direction between the ring-shaped outer element and the connecting element and the spokes are elastic;
wherein the spoke springs are arranged one behind another in a direction of an axis of rotation, and the spoke springs adjacent to one another in the direction of the axis of rotation are in contact.

11. The vibration damper according to claim 10, further comprising a third absorber including at least one of the plurality of spoke springs and having a third natural frequency, and the first, second, and third natural frequencies are different than one another.

12. The vibration damper according to claim 10, wherein at least one of the first absorber or the second absorber comprises a plurality of the spoke springs each having the natural frequency of the absorber.

13. The vibration damper according to claim 10, wherein the spoke springs comprise torsion spring bars.

14. A vibration damper for damping a vibration behavior of a crankshaft system having a crankshaft natural frequency, the vibration damper comprising the vibration damper according to claim 10, wherein the first natural frequency is below the crankshaft natural frequency and the second natural frequency is above the crankshaft natural frequency.

15. The vibration damper according to claim 14, further comprising a further absorber including at least one of the plurality of spoke springs and having a further natural frequency, the further natural frequency of the further absorber deviates by at most 20 Hz from a frequency of a maximum of a frequency response of the crankshaft system damped by the first and second absorbers.

16. A vibration damper for damping a vibration behavior of a crankshaft system having a crankshaft natural frequency, the vibration damper comprising:
a first absorber and a second absorber, each of the first absorber and the second absorber having a respective first and second natural frequency, with the first natural frequency being different than the second natural frequency, each of the first absorber and the second absorber comprising a spoke spring including:
a ring-shaped outer element radially on an outside;
a connecting element radially on an inside; and
a plurality of spokes extending in a radial direction between the ring-shaped outer element and the connecting element and the spokes are elastic;
wherein the first natural frequency deviates by at most 10 Hz from the crankshaft natural frequency, and the second natural frequency deviates by at most 20 Hz from a frequency of a maximum of a frequency response of the crankshaft system damped by the first absorber.

* * * * *